United States Patent [19]

Uekama et al.

[11] Patent Number: 5,517,493
[45] Date of Patent: May 14, 1996

[54] LINE SETTING AND PHASE ADJUSTING APPARATUS FOR SYNCHRONOUS MULTIPLEX COMMUNICATIONS

[75] Inventors: Kimio Uekama; Hideaki Mochizuki, both of Kawasaki, Japan

[73] Assignee: Fujitsu Limited, Kanagawa, Japan

[21] Appl. No.: 215,314

[22] Filed: Mar. 21, 1994

[30] Foreign Application Priority Data

Sep. 16, 1993 [JP] Japan ................................ 5-229816

[51] Int. Cl.⁶ .................................................. H04L 12/52
[52] U.S. Cl. ........................... 370/58.1; 370/63; 370/59; 370/108
[58] Field of Search ................... 370/58.1, 58.2, 370/58.3, 60, 60.1, 63, 94.1, 94.2, 105.3, 108, 59

[56] References Cited

U.S. PATENT DOCUMENTS

| | | | |
|---|---|---|---|
| 4,429,386 | 1/1984 | Graden | 370/108 |
| 4,488,292 | 12/1984 | Troost | 370/63 |
| 4,621,357 | 11/1986 | Naiman | 370/58.2 |
| 5,146,453 | 9/1992 | Nagler et al. | 370/58.2 |
| 5,335,223 | 8/1994 | Iino | 370/108 |

*Primary Examiner*—Wellington Chin

[57] ABSTRACT

The setting and phase adjusting apparatus for synchronous multiplex communications is provided which adjusts phase differences of main signals caused between a plurality of synchronous multiplexing sections and a line setting section during line setting, in which to reduce the scale of circuitry of the line setting section in a transmission device for carrying out multiplexing and line setting on large-capacity signals, a plurality of pointer modifiers are arranged on a shelf on which the line setting section is arranged. The pointer modifiers connect the line setting section to the respective synchronous multiplexing sections. The pointer modifiers are supplied with multiplexed signals of respective signal series whose data head positions are shifted from one another. The head positions of these signals are synchronized with a timing signal from a timing generator by the pointer modifiers. Line switching is then effected by time switches and a space switch.

7 Claims, 8 Drawing Sheets

LINE SETTING AND PHASE ADJUSTING APPARATUS FOR SYNCHRONOUS MULTIPLEX COMMUNICATIONS

BACKGROUND OF THE INVENTION

1. Field of the Invention

The present invention relates to a line setting and phase adjusting apparatus for synchronous multiplex communications which is capable of adjusting phase differences of main signals caused between a line setting unit and a respective synchronous multiplexing unit during a line setting operation, and more particularly, to a line setting and phase adjusting apparatus for synchronous multiplex communications, which is used for the line setting of main signals in a transmission device having a line setting function according to SONET (Synchronous Optical NETWORK) or SDH (Synchronous Digital Hierarchy).

2. Description of the Related Art

With the recent development of communications technology, the amount of signals dealt with in synchronous networks keeps on increasing on a worldwide scale. Accordingly, the amount of signals subjected to multiplexing or line setting (line switching) in a transmission device is also increasing, and situations are expected where a synchronous multiplexing section and a line setting section of the transmission system cannot be incorporated in the same shelf due to a circuitry scale. In such situations, a plurality of synchronous multiplexing units and a line setting unit must be set on separate shelves.

In a conventional transmission device in a synchronous network, multiplexing and line setting of small-capacity signals can be carried out by a synchronous multiplexing section and a line setting section, both arranged on a single shelf, as shown in FIG. 1. Specifically, the synchronous multiplexing section comprises, for example, three multiplexers (MUXs) 51 to 53, three pointer modifiers 54 to 56 connected to the respective multiplexers, and a timing generator 57 the output of which is inputted to the pointer multiplexers 54–56, and the line setting section comprises six time switches (T-SW) 58 to 60 each being interconnected to the respective pointer modifier of the synchronous multiplexing section switches 62 to 64 and a space switch (S-SW) 61.

The multiplexers 51 to 53 are each supplied with signals of n channels (CH1 to CHn) for multiplexing from a low-level hierarchy device at the same bit rate. It is here assumed that three series (#1 to #3) of multiplexed signals are to be obtained.

FIG. 2(A) schematically illustrates the frame structure of n-channel signals supplied to each multiplexers of FIG. 1. The illustrated example uses a VT frame; and in the figure, each block consists of one byte, and V1 and DT1 each represent the data name of the corresponding block. The n channels of such signals are multiplexed at each of the multiplexers 51 to 53, to obtain a signal having a frame structure shown in FIG. 2(B).

Referring again to FIG. 1, when the signals are combined into a frame of upper-level hierarchy having the structure shown in FIG. 2(B), each of the pointer modifiers 54 to 56 receiving the multiplexed signal from the respective multiplexer affixes a new pointer representing the head position of the multiplexed signal, and also synchronizes the head position with a timing signal supplied from the timing generator 57.

FIG. 3 illustrates the signal processing operations of the pointer modifiers 54 to 56 and timing generator 57. As illustrated, series #1 to #3 of multiplexed signals are supplied to the pointer modifiers 54 to 56, respectively, with their phases shifted from one another. Each of the pointer modifiers 54 to 56 replaces pointers, and outputs the multiplexed signal in such manner that the head position of the multiplexed signal is synchronized with the falling edge of a timing pulse 57a supplied from the timing generator 57.

Referring again to FIG. 1, each of the time switches 58 to 60 transposes time slots of the multiplexed signal, supplied thereto from the corresponding one of the pointer modifiers 54 to 56, within the same multiplexed signal, and the space switch 61 transposes the time slots of the same input timing within the multiplexed signals supplied from the time switches 58 to 60. Further, each of the time switches 62 to 64 receiving the outputs of the space switch 61 transposes the time slots of the corresponding multiplexed signal, supplied from the space switch 61, within the same multiplexed signal, whereby line setting (line switching) is achieved. The multiplexed signals which have been subjected to the line setting in this manner are supplied to high-level hierarchy devices.

FIG. 4 illustrates the operation of each of the time switches 58 to 60 and 62 to 64. Switch 58 is shown as an example. It is here assumed that the multiplexed signal shown in FIG. 2(B) is supplied to the time switch 58, for example (in FIG. 4, only the first five bytes of the multiplexed signal shown in FIG. 2(B) are illustrated with the indication "V1" omitted). The time switch 58 first stores a predetermined number of time slots, and then transposes the time slots in accordance with a predetermined transpose command. For example, the positions of the first, second and third time slots are shifted to the third, fifth and second positions, respectively. As a result, a multiplexed signal shown in the right-hand part of FIG. 4 is delivered from the time switch 58, for example.

FIG. 5 illustrates the signal processing operation of the space switch 61. Here, it is assumed that the space switch 61 is supplied with series #1 to #3 of the multiplexed signals shown in FIG. 2(B), for example (in FIG. 5, only the first five bytes of the multiplexed signal shown in FIG. 2(B) are illustrated with the indication "V1" omitted). The space switch 61 transposes the time slots supplied at the same timing within the multiplexed signals. For example, for the first input timing, the time slots of series #1 and #3 are transposed; for the second input timing, the time slots of series #1, #2 and #3 are changed to the time slots of the series #3, #1 and #2, respectively. In order for the space switch 61 to perform such signal-processing operation, it is necessary that the time slots to be transposed be supplied to the switch 61 at the same input timing. To this end, the pointer modifiers 54 to 56 previously synchronize the head positions of the respective multiplexed signals with each other.

In the above-described transmission device in which the synchronous multiplexing section and the line setting section can be incorporated in the same shelf, differences in length of the lines connecting the multiplexers 51 to 53 of the synchronous multiplexing section to the time switches 58 to 60 of the line setting section are, if present, small because the lengths of the lines within the same shelf are limited. Accordingly, the phase difference of signals on these lines, caused by the above difference, does not affect the operation of the line setting section at all.

However, in cases where a transmission device is required, in which large-capacity signals are to be subjected to multiplexing and line setting, the synchronous multiplexing section and the line setting section need be separated from each other, and moreover, the synchronous multiplexing section should be divided into a plurality of subsections, so that the respective sections and subsections are arranged on separate shelves, as shown in FIG. 6.

More specifically, a multiplexer (MUX) 65a and a pointer modifier 65b associated with signals of series #1 are arranged on a shelf 65 of the synchronous multiplexing section. Similarly, a multiplexers (MUX) 66a and a pointer modifier 66b associated with signal series #2 are arranged on another shelf 66 of the synchronous multiplexing section, and a multiplexer (MUX) 67a and a pointer modifier 67b associated with series #m are arranged on still another shelf 67 of the synchronous multiplexing section. On a shelf 68 of the line setting section, are arranged time switches 69 to 71 and 73 to 75, a space switch 72, a timing generator 76, as well as phase adjusting circuits 77 to 79 associated with the respective series of multiplexed signals.

Here, it is assumed that the distances between the shelf 68 of the line setting section and the respective shelves 65 to 67 of the synchronous multiplexing section are different and are L1, L2, ..., Lm, respectively (L1< L2< ... <Lm). In this case, where the distance L1 between the shelves 65 and 68 is used as a reference distance, the distances between the shelf 68 and the respective shelves 66 to 67 differ from the reference distance by (L2–L1), ..., (Lm–L1), respectively. Accordingly, when a timing signal is distributed from the timing generator 76 arranged on the shelf 68 of the line setting section, to the pointer modifiers 65b to 67b, respectively, arranged on the shelves 65 to 67 of the synchronous multiplexing section, and then the pointer modifiers 65b to 67b synchronize the head positions of the respective multiplexed signals with this timing signal. The multiplexed signals supplied to the shelf 68 are subject to phase differences corresponding, respectively, to the differences in the distances 2×(L2–L1), ... 2×(Lm–L1), which affect the line setting operation of the space switch 72. To avoid this, the phase adjusting circuits 77 to 79 are provided for eliminating the phase differences of multiplexed signals.

Thus, in the transmission device in which large-capacity signals are multiplexed and the lines are set, the distances between the shelf 68 of the line setting section and the respective shelves 65 to 67 of the synchronous multiplexing section can differ from each other, because the shelves 65 to 67 and 68 may be formed as separate shelves. The differences in distances can often be relatively large, in which case the phase adjusting circuits 77 to 79 must be provided at the shelf 68 of the line setting section since the multiplexed signals have phase differences due to the differences in the above-described distances. If, however, the phase adjusting circuits 77 to 79 are provided for the respective signal series #1 to #m of multiplexed signals, the scale of circuitry will inevitably increase, which would lead to increased costs thereof.

SUMMARY OF THE INVENTION

It is an object of the present invention to provide a line setting and phase adjusting apparatus for synchronous multiplex communications, of which a transmission device for multiplexed large-capacity signals subjected to line setting includes a line setting section the scale of circuitry of which is reduced.

To achieve this and other objects, there is provided a line setting and phase adjusting apparatus for synchronous multiplex communications, which adjusts phase differences of main signals, caused between line setting means and a plurality of synchronous multiplexing means during line setting. The line setting and phase adjusting apparatus comprises a plurality of synchronous multiplexing means arranged on respective shelves, line setting means arranged on a single shelf, and a plurality of pointer modifying means arranged on the shelf on which the line setting means is arranged, and connecting the line setting means to the respective synchronous multiplexing means.

Preferably, the pointer modifying means include means for synchronizing data head positions of signals, supplied from the respective synchronous multiplexing means with each other.

In a preferred embodiment, the line setting and phase adjusting apparatus further comprises timing signal generating means arranged on the shelf on which the line setting means is arranged, for supplying a timing signal to each of the pointer modifying means.

With the arrangement described above, the pointer modifying means are supplied with multiplexed signals of respective series of signals whose data head positions are shifted from one another, but the phases of these signals are adjusted by the pointer modifying means. Specifically, the pointer modifying means synchronize the data head positions of the input signals with the same timing signal from the timing signal generating means. The line setting means includes first and second time switches. Each of the first time switches in the line setting means transposes the time slots of the multiplexed signal, supplied from the corresponding pointer modifying means, within the same multiplexed signal, and a space switch in the line setting means transposes the time slots of the same input timing signal within the multiplexed signals supplied from the first time switches. Further, each of the second time switches in the line setting means transposes the time slots of the corresponding multiplexed signal, supplied from the space switch, within the same multiplexed signal. Thus, line setting (line switching) is achieved. The multiplexed signals which have been subjected to the line setting in this manner are then supplied to high-level hierarchy devices.

Since the pointer modifying means are arranged on the shelf on which the line setting means is located, variations in data head positions of the multiplexed signals, caused due to differences in the distances between the shelf of the line setting means and the respective shelves of the synchronous multiplexing means can be absorbed.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2(A) is a diagram illustrating the frame structure of signals supplied to a multiplexer via respective channels;

FIG. 2(B) is a diagram illustrating the frame structure of a signal obtained by multiplexing n-channel signals at the multiplexer;

DESCRIPTION OF THE PREFERRED EMBODIMENTS

Embodiments of the present invention will be described in detail.

Figure 7:
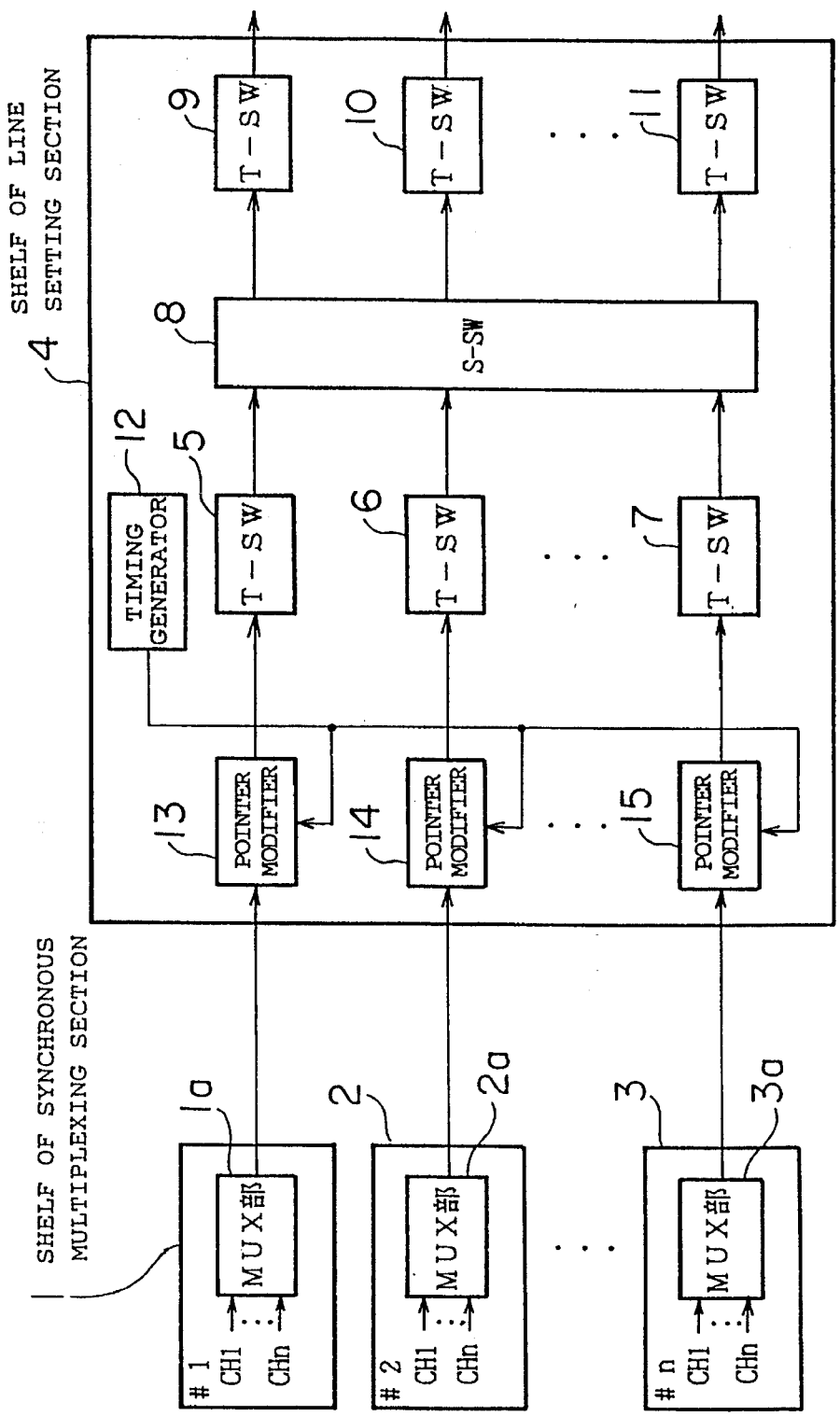
FIG. 7 is a block diagram illustrating a first embodiment of the present invention.

FIG. 7 is a block diagram of a synchronous multiplex communication system including a phase adjusting apparatus according to a first embodiment of the present invention. FIG. 7 illustrates, in particular, a synchronous multiplexing section and a line setting section of the synchronous multiplex communication system.

An multiplexer (MUX) 1a for series #1 is arranged on a shelf 1 of the synchronous multiplexing section. Similarly, multiplexers (MUXs) 2a and 3a for signal series #2 and #m, respectively, are arranged on shelves 2 and 3 of the synchronous multiplexing section, respectively. The multiplexers (MUXs) 1a to 3a are each supplied with signals of n channels (CH1 to CHn) from a low-level hierarchy device at an equal bit rate and multiplex the input signals. It is here assumed that m series (#1 to #m) of multiplexed signals are obtained. Further, the signals supplied from the respective channels have a frame structure similar to that shown in FIG. 2(A), and a multiplexed signal obtained by multiplexing the n-channel signals at each multiplexer (MUX) has a frame structure similar to that shown in FIG. 2(B).

Figure 1:
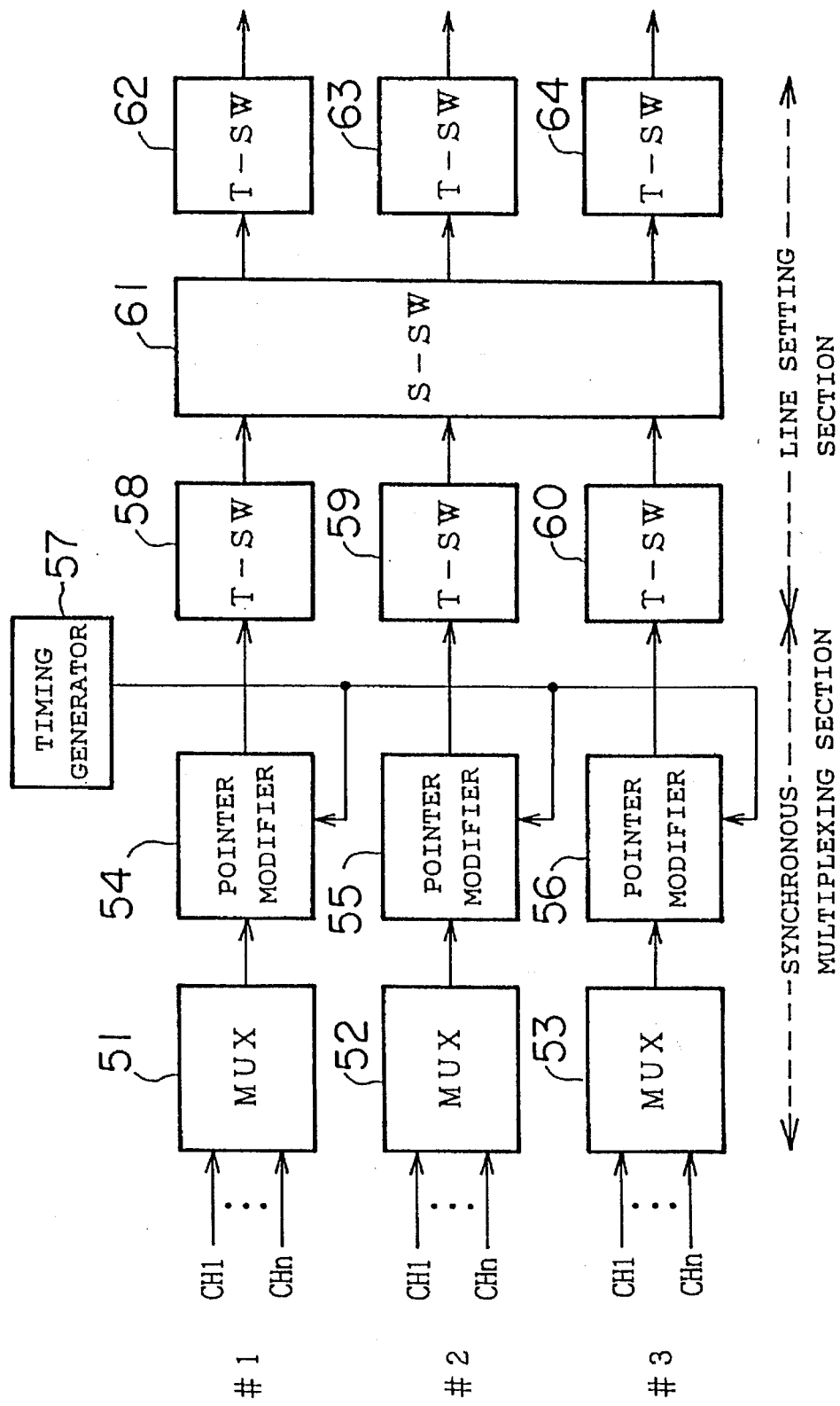
FIG. 1 is a block diagram of a conventional multiplexing and line setting apparatus.
Figure 3:
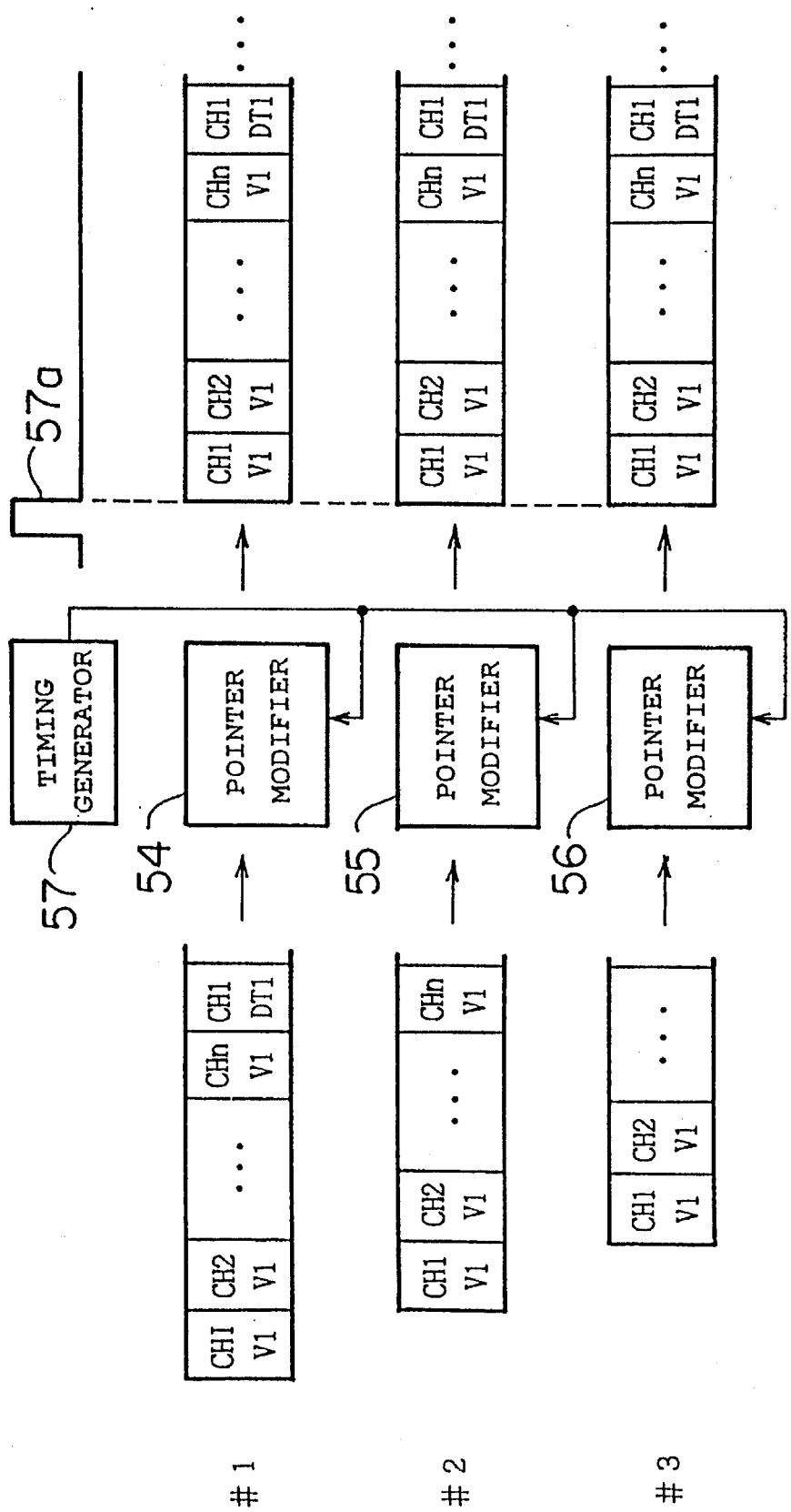
FIG. 3 is a diagram illustrating the signal-processing operations of pointer modifiers and a timing signal generator.
Figure 4:
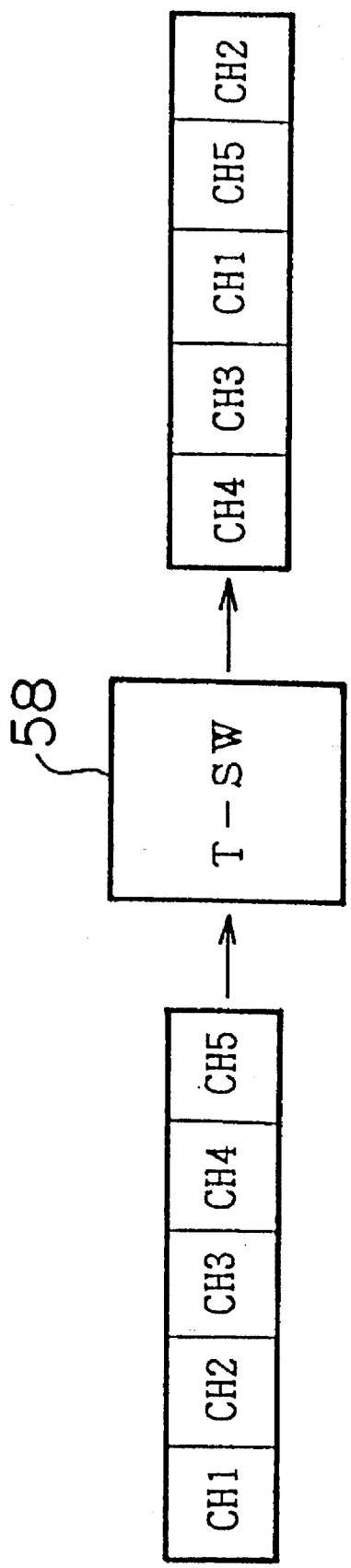
FIG. 4 is a diagram illustrating the signal-processing signal operation of a time switch.
Figure 5:
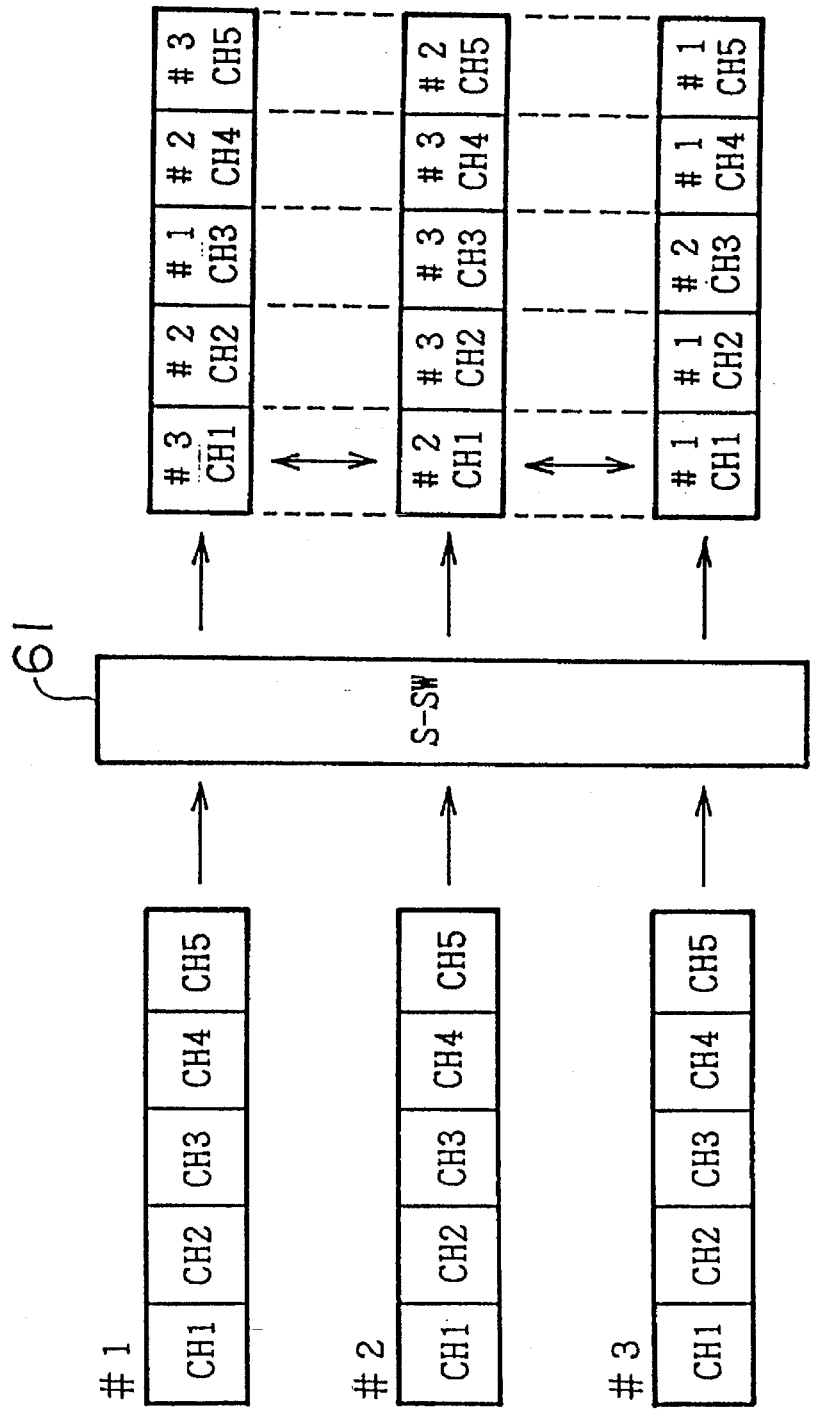
FIG. 5 is a diagram illustrating the signal-processing operation of a space switch.
Figure 6:
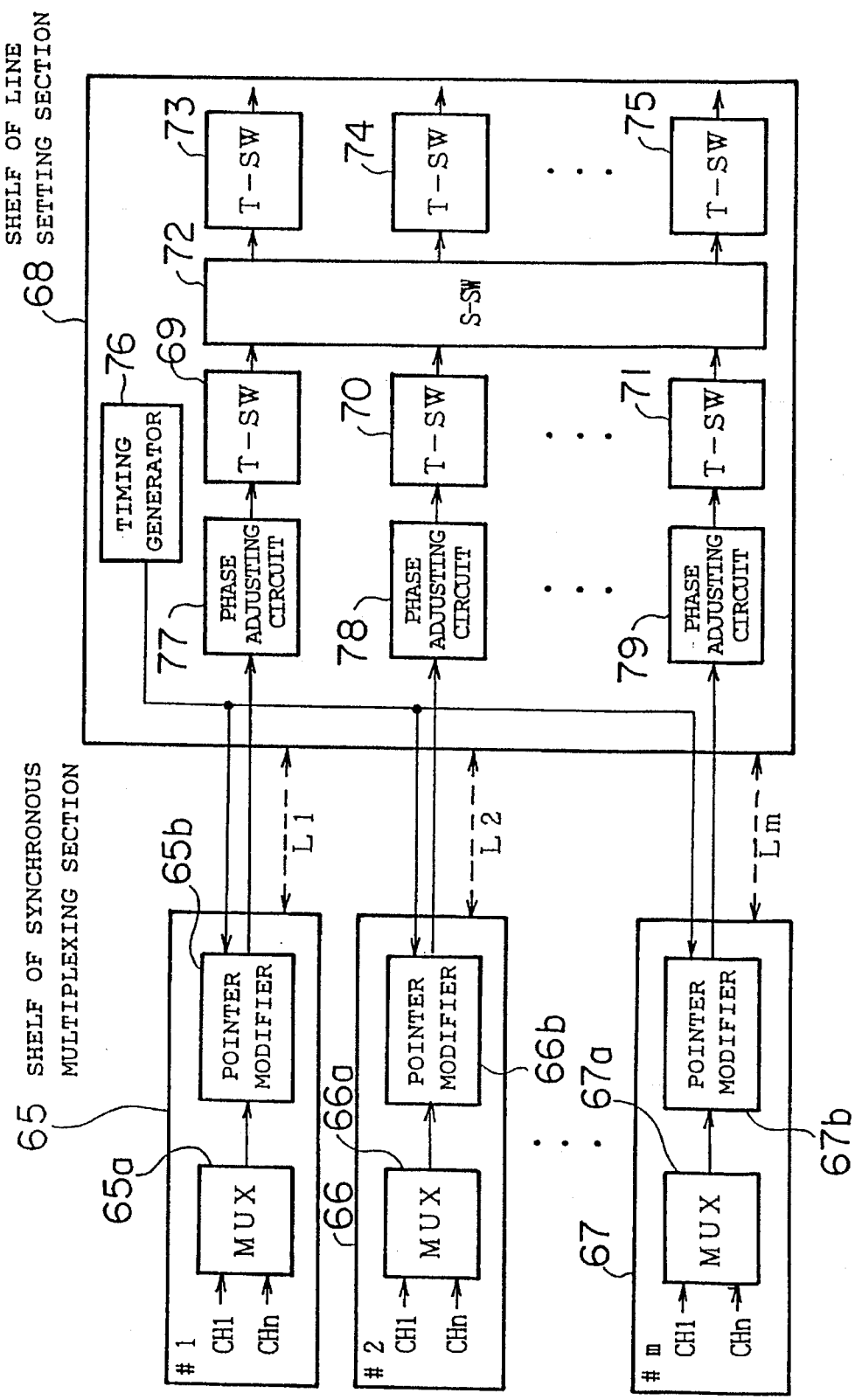
FIG. 6 is a block diagram of a conventional multiplexing and line setting apparatus in which a synchronous multiplexing section is separated from a line setting section.

On a shelf 4 of the line setting section, are arranged time switches 5 to 7 and 9 to 11, a space switch 8, a timing generator 12, and pointer modifiers 13 to 15 associated with the respective multiplexers generating respective series of multiplexed signals. A timing signal from the timing generator 12 is supplied to each of the pointer modifiers 13 to 15. The pointer modifiers 13 to 15 have input terminals connected to the output terminals of the respective multiplexers (MUXs) 1a to 3a arranged on the shelves 1 to 3 of the synchronous multiplexing section, and have output terminals connected to the input terminals of the respective time switches 5 to 7. The time switches 5–7 and 9–11 and the space switch 8 are configured in the same manner as the corresponding ones of the time switches 58–60 and 62–64 and the space switch 61 explained with reference to FIGS. 1, 4 and 5.

Figures 2A, 2B:
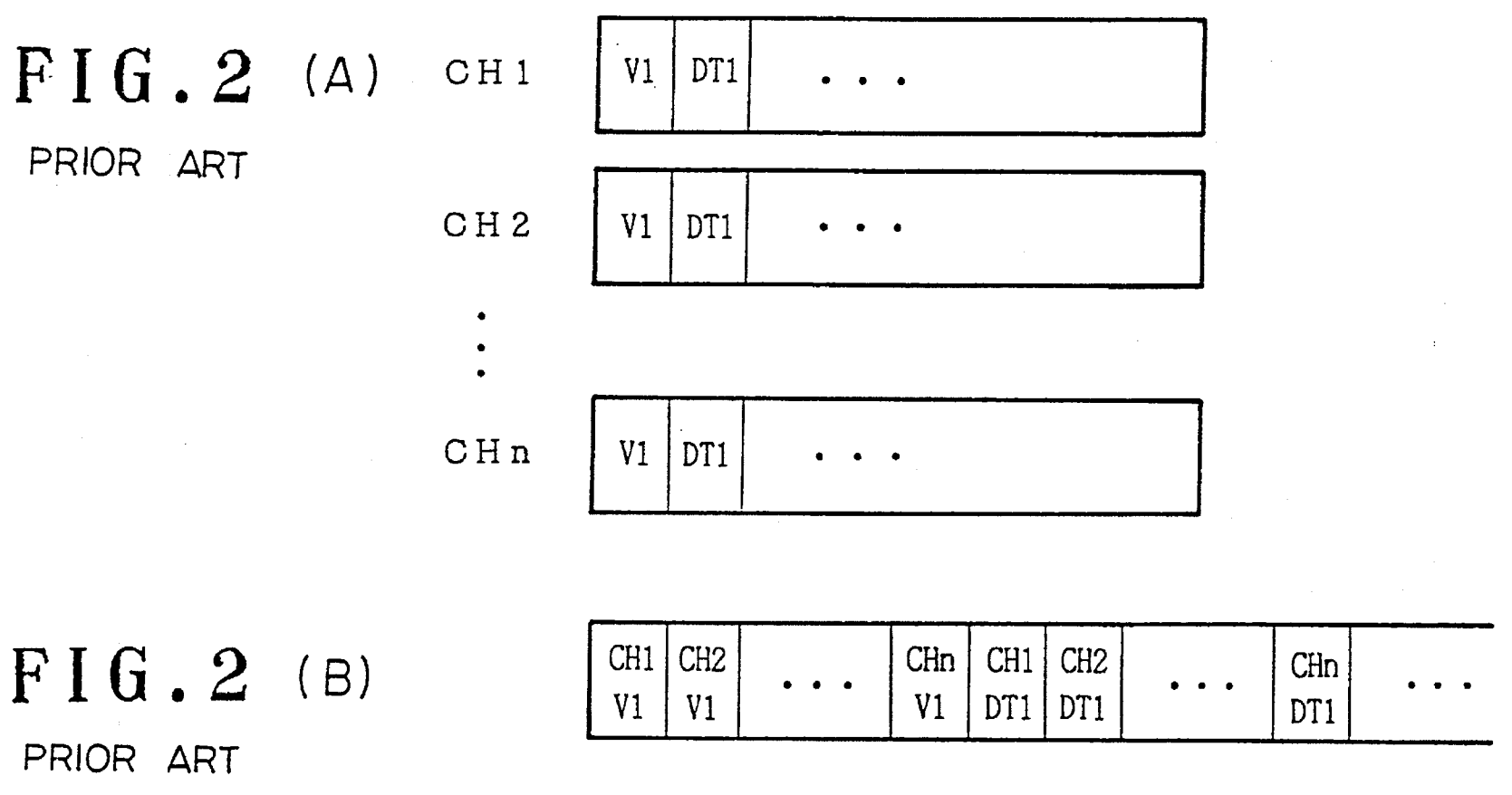

When the signals are combined into a signal of upper-level hierarchy having the frame structure shown in FIG. 2(B), the pointer modifiers 13 to 15 each affix a new pointer indicating the head position of the signal. Also, each pointer modifier synchronizes the head position of the signal with the timing signal supplied from the timing signal generator 12.

Namely, although the pointer modifiers 13 to 15 are supplied with multiplexed signals of respective series of signals (#1 to #m) whose head positions are shifted from one another, the head positions of these signals are synchronized with the same timing signal from the timing generator 12 by the pointer modifiers 13 to 15, respectively. Then, each of the time switches 5 to 7 each transposes the time slots of the multiplexed signal, supplied from the corresponding pointer modifier, within the same multiplexed signal, and the space switch 8 transposes the time slots of the same input timing within the multiplexed signals supplied from the time switches 5 to 7. Further, each of the time switches 9 to 11 each transposes the time slots of the corresponding multiplexed signal, supplied from the space switch 8, within the same multiplexed signal. Thus, the line setting (line switching) is achieved. The multiplexed signals which have been subjected to the line setting in this manner are then supplied to high-level hierarchy devices (not shown).

Since the pointer modifiers 13 to 15 are arranged on the shelf 4 of the line setting section, variations in head position of the multiplexed signals, caused due to differences in distances between the shelf 4 and the respective shelves 1 to 3 of the synchronous multiplexing section can be absorbed.

A second embodiment of the present invention will be now described.

Figure 8:
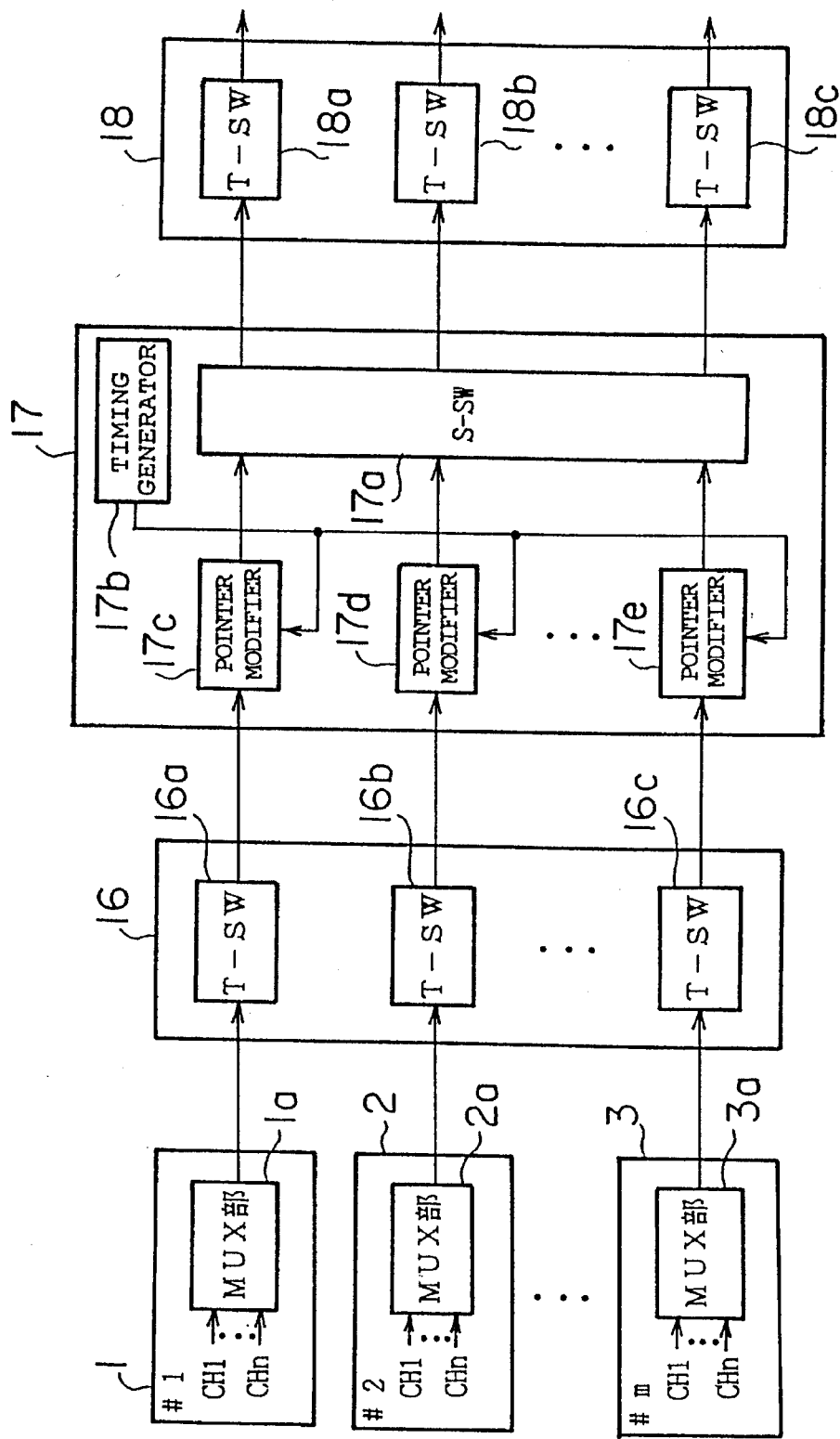
FIG. 8 is a block diagram illustrating a second embodiment of the present invention.

FIG. 8 is a block diagram of a synchronous multiplex communication system including a phase adjusting apparatus according to the second embodiment of the invention. In transmission devices for carrying out synchronous multiplexing and line setting on larger-capacity signals than those processed in the system of the first embodiment, it is possible that the shelf of the line setting section may be separated into a shelf for the first time switch section, a shelf for the space switch section, and a shelf for the second time switch section. The second embodiment provides a phase adjusting apparatus which has such separate shelves and which is effective in cases where the lines associated with series #1 to #m of multiplexed signals and connecting the shelf of the first time switch section to the shelf of the space switch section have different lengths.

In the second embodiment, the shelves 1 to 3 of the synchronous multiplexing section are constructed in the same manner as those of the first embodiment; therefore, the same reference numerals are used to indicate the corresponding parts and explanation of these parts is omitted.

Time switches 16a to 16c associated with series #1 to #m of multiplexed signals, respectively, are arranged on a shelf 16 of the first time switch section. On a shelf 17 of the space switch section are arranged a space switch 17a, a timing generator 17b, and pointer modifiers 17c to 17e associated with the respective series of multiplexed signals. A timing signal from the timing generator 17b is supplied to each of the pointer modifiers 17c to 17e. The pointer modifiers 17c to 17e have input terminals connected to the output terminals of the respective time switches 16a to 16c arranged on the shelf 16 of the first time switch section, and have output terminals connected to the respective input terminals of the space switch 17a. Time switches 18a to 18c associated with respective series #1 to #m of multiplexed signals and connected to the respective outputs of the space switch 17a, are arranged on a shelf 18 of the second time switch section. The time switches 16a–16c and 18a–18c and the space switch 17a are configured in the same manner as the corresponding ones of the time switches 58–60 and 62–64 and the space switch 61 explained with reference to FIGS. 1, 4 and 5.

With this arrangement, each of the time switches 16a to 16c transposes the time slots of the multiplexed signal, supplied from the corresponding multiplexer, within the same multiplexed signal, and supplies the resultant signal to the corresponding pointer modifier. Although the pointer modifiers 17c to 17e are supplied with multiplexed signals of the respective series (#1 to #m) whose head positions are shifted from one another, the head positions of these signals are synchronized with the same timing signal from the timing generator 17b by the pointer modifiers 17c to 17e, respectively. Then, the space switch 17a transposes the time slots of the same input timing within the multiplexed signals whose head positions have been synchronized, and outputs the resultant signals. Further, each of the time switches 18a to 18c transposes the time slots of the corresponding multiplexed signal, supplied from the space switch 17a, within the same multiplexed signal. Thus, the line setting (line switching) is achieved. The multiplexed signals which have been subjected to the line setting in this manner are then supplied to high-level devices (not shown).

Since the pointer modifiers 17c to 17e are arranged so as to immediately precede the space switch 17a, it is possible to absorb variations in head positions of the multiplexed signals, caused due to differences in distances between the shelf 16 of the first time switch section and the respective shelves 1 to 3 of the synchronous multiplexing section, or due to differences in length of the lines connecting the shelf 16 of the first time switch section to the shelf 17 of the space switch section and associated with respective series #1 to #m of multiplexed signals.

As described above, according to the present invention, the pointer modifying means are arranged on the shelf on which the line setting means is arranged, whereby variations in head position of the multiplexed signals, caused due to differences in distances between the shelf of the line setting means and the respective shelves of the synchronous multiplexing means can be absorbed. Accordingly, it is unnecessary to provide a phase adjusting circuit for each of a plurality of series of multiplexed signals, unlike the conventional apparatus, and the circuitry of the transmission device for carrying out multiplexing and line setting on large-capacity signals can be reduced in scale, whereby the cost can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A line setting and phase adjusting apparatus in combination with a transmission system for synchronous multiplex communications, for adjusting phase differences of main signals transmitted between a plurality of synchronous multiplexing means and line setting means, caused during line setting, the apparatus comprising:

a plurality of synchronous multiplexing means arranged on a plurality of shelves, respectively, for synchronously multiplexing signals received therein and outputting multiplexed signals;

line setting means arranged on a single shelf; and a plurality of pointer modifying means arranged on said single shelf on which said line setting means is arranged, said plurality of pointer modifying means connecting said plurality of synchronous multiplexing means, respectively, to said line setting means, said plurality of pointer modifying means receiving the multiplexed signals from respective synchronous multiplexing means, and said plurality of pointer modifying means including means for synchronizing data head positions of the signals supplied from said plurality of synchronous multiplexing means, with each other.

2. The line setting and phase adjusting apparatus according to claim 1, and further comprising timing signal generating means arranged on the shelf on which said line setting means is arranged, for supplying a timing signal to each of said plurality of pointer modifying means.

3. The line setting and phase adjusting apparatus according to claim 1, wherein said line setting means includes at least one time switch coupled to said plurality of pointer modifying means, for transposing time slots of said multiplexed signals, and a space switch, coupled to said at least one time switch, for transposing time slots of input timing within the multiplexed signals received from said at least one time switch, to execute line setting.

4. A line setting and phase adjusting apparatus in combination with a transmission system for synchronous multiplex communications, for adjusting phase differences of main signals transmitted between a plurality of synchronous multiplexing means and line setting means, said phase difference being caused during line setting, the apparatus comprising:

a plurality of synchronous multiplexing means arranged on a plurality of shelves, respectively, for synchronously multiplexing signals received therein and outputting multiplexed signals;

line setting means arranged on a first shelf and including a space switch for executing line setting; and a plurality of pointer modifying means arranged on said first shelf on which said line setting means is arranged, said plurality of pointer modifying means connecting said line setting means to said plurality of synchronous multiplexing means, respectively.

5. The line setting and phase adjusting apparatus according to claim 4, and further comprising:

a plurality of first time switches arranged on a second shelf and connecting said plurality of synchronous multiplexing means to said plurality of pointer modifying means, respectively, and for transposing time slots of the multiplexed signals received from said plurality of synchronous multiplexing means; and a plurality of second time switches arranged on a third shelf and corresponding to said plurality of synchronous multiplexing means, respectively, said second time switches being coupled to said line setting means for receiving outputs of said space switch of said line setting means arranged on said first shelf and transposing time slots within the multiplexed signals received therein.

6. The line setting and phase adjusting apparatus according to claim 5, wherein said plurality of pointer modifying means include means for synchronizing data head positions of signals, supplied from said plurality of first time switches, with each other.

7. The line setting and phase adjusting apparatus according to claim 4, and further comprising timing signal generating means arranged on said first shelf on which said line setting means is arranged, for supplying a timing signal to each of said plurality of pointer modifying means.

* * * * *